US010657200B2

(12) United States Patent
Gaither et al.

(10) Patent No.: US 10,657,200 B2
(45) Date of Patent: May 19, 2020

(54) PROACTIVE FORM GUIDANCE FOR INTERACTING WITH ELECTRONIC FORMS

(71) Applicant: Adobe Inc., San Jose, CA (US)

(72) Inventors: Shawn Gaither, Raleigh, NC (US); Richard Treitman, Lexington, MA (US); David Parmenter, Newton, MA (US); Arian Behzadi, San Francisco, CA (US); Kyeung sub Yeom, San Mateo, CA (US); James Alisago, Felton, CA (US); Frederic Thevenet, San Francisco, CA (US); Andres Gonzalez, Wake Forest, NC (US); Anatole Matveief, San Jose, CA (US)

(73) Assignee: Adobe Inc., San Jose, CA (US)

( * ) Notice: Subject to any disclaimer, the term of this patent is extended or adjusted under 35 U.S.C. 154(b) by 140 days.

(21) Appl. No.: 14/988,044

(22) Filed: Jan. 5, 2016

(65) Prior Publication Data

US 2017/0192949 A1 Jul. 6, 2017

(51) Int. Cl.
*G06F 17/24* (2006.01)
(52) U.S. Cl.
CPC .................. *G06F 17/243* (2013.01)
(58) Field of Classification Search
CPC ........ G06F 17/243; G06F 3/167; G06F 17/24; G06F 9/453; G06Q 10/063114; G06Q 10/06316; G06Q 10/06314; G06Q 10/0633

(Continued)

(56) References Cited

U.S. PATENT DOCUMENTS 6,415,284 B1 * 7/2002 D'Souza ................. G06Q 10/10
6,961,896 B1 * 11/2005 Rousselle ............... G06F 17/24
715/205

(Continued)

OTHER PUBLICATIONS

Bui, Trung and Martin Rajman, Rapid Dialoge Prototyping Methodology. [online] EPFL Technical Report IC/2004/01, Jan. 5, 2004 [retrieved on Dec. 10, 2015]. Retrieved from the Internet: <URL: http://liawww.epfl.ch/Publications/Archive/Bui2004.pdf>, 17 pages.

(Continued)

*Primary Examiner* — Wilson W Tsui
(74) *Attorney, Agent, or Firm* — Kilpatrick Townsend & Stockton LLP

(57) ABSTRACT

Techniques for guiding an interaction with an electronic form via a computing device are described. For example, a form guidance engine is initiated. The form guidance engine maintains a state of the electronic form. The form guidance engine also maintains user information in, for example, a user profile. The user information is associated with a user of the computing device and relates to how the user interacts with the electronic form. Based on the user information, the form guidance engine anticipates a potential interaction with the electronic form given the state. Accordingly and prior to a user request for information about the electronic form, the form guidance engine generates a presentation configured to guide the user to perform the potential interaction with the electronic form via a computing device. A user response to the presentation is received. The form guidance engine performs an action associated with the electronic form and updates the state of the electronic form.

20 Claims, 8 Drawing Sheets

(58) Field of Classification Search
USPC .......................................................... 715/224
See application file for complete search history.

(56) References Cited

U.S. PATENT DOCUMENTS

| | | | |
|---|---|---|---|
| 7,543,228 B2 | 6/2009 | Kelkar et al. | |
| 7,814,431 B1 | 10/2010 | Quinn et al. | |
| 8,065,602 B2 | 11/2011 | Campbell | |
| 9,262,393 B2* | 2/2016 | Naderi | G06F 17/243 |
| 9,384,180 B2 | 7/2016 | Piratla et al. | |
| 9,430,455 B2 | 8/2016 | Schuster | |
| 9,727,548 B2 | 8/2017 | Watanabe | |
| 2006/0064302 A1 | 3/2006 | Ativanichayaphong et al. | |
| 2006/0074652 A1 | 4/2006 | Ativanichayaphong et al. | |
| 2008/0215976 A1* | 9/2008 | Bierner | G06F 17/243 |
| | | | 715/708 |
| 2009/0204881 A1 | 8/2009 | Sreerama et al. | |
| 2010/0179962 A1* | 7/2010 | Schuster | G06F 17/243 |
| | | | 707/769 |
| 2010/0211863 A1 | 8/2010 | Jones et al. | |
| 2011/0015929 A1 | 1/2011 | Fantin et al. | |
| 2011/0185029 A1* | 7/2011 | Jain | G06Q 10/109 |
| | | | 709/207 |
| 2013/0041243 A1 | 2/2013 | Byrd et al. | |
| 2013/0117647 A1 | 5/2013 | WeissMalik | |
| 2013/0198628 A1 | 8/2013 | Ethier et al. | |
| 2013/0212521 A1 | 8/2013 | Fedoseyeva et al. | |
| 2014/0033011 A1 | 1/2014 | Wandeler et al. | |
| 2014/0108904 A1* | 4/2014 | Ichikawa | G06F 17/243 |
| | | | 715/224 |
| 2014/0129914 A1* | 5/2014 | Agarwal | G06F 17/243 |
| | | | 715/226 |
| 2014/0208194 A1 | 7/2014 | O'Leary et al. | |
| 2015/0356696 A1* | 12/2015 | Oz | G06Q 50/18 |
| | | | 705/311 |
| 2016/0085317 A1 | 3/2016 | Agarwal | |
| 2016/0314109 A1 | 10/2016 | Singh et al. | |
| 2016/0335577 A1* | 11/2016 | Richards | G06Q 10/06316 |
| 2017/0075701 A1 | 3/2017 | Ricci et al. | |
| 2017/0132191 A1 | 5/2017 | Ringuette | |
| 2017/0192950 A1 | 7/2017 | Gaither et al. | |
| 2017/0372699 A1 | 12/2017 | Bakshi et al. | |
| 2018/0039610 A1* | 2/2018 | Litvak | G06F 17/30702 |

OTHER PUBLICATIONS

Olympus. [online]. CMU Speech Lab, Feb. 12, 2015 [retrieved on Dec. 10, 2015]. Retrieved from the Internet: <URL: http://wiki.speech.cs.cmu.edu/olympus/index.php/Olympus>, 3 pages.

* cited by examiner

PROACTIVE FORM GUIDANCE FOR INTERACTING WITH ELECTRONIC FORMS

TECHNICAL FIELD

This disclosure relates generally to techniques for interacting with an electronic form.

BACKGROUND

Users commonly use computing devices to fill out electronic forms. Electronic forms are of different types, are available from different sources, and are used in different ways. In one example, a user receives an email including a link to an electronic form. By clicking on the link, the electronic form is downloaded from a web site to the user's computing device. Thereafter, the user uses an application on the computing device to fill out the electronic form. The user then also uses the same or a different application to email the electronic form to a recipient. In another example, the user downloads a form from a webpage, completes the form using a local application, and uploads the completed form to the webpage.

Generally, an interaction with an electronic form (e.g., download, fill out, email, etc.) involves operating an application hosted on a computing device of a user. Different types of interactions can involve different applications. For example, the download application can be different from the fill out application. Although some applications allow multiple types of interactions, each of such applications necessitates a configuration of the electronic form specific to the application. Thus, even when supporting multiple interactions, the application is often limited to a particular type of form and source of electronic forms.

In addition, an application for interacting with an electronic form is typically a passive application in the sense that an active request of the user for the electronic form is needed prior to any interaction. For example, a personal assistant application running on a smartphone requires the user to identify the electronic form and request the download. Other applications have relatively complex dashboards that let the user passively analyze what work should be done next. Thus, the user has to actively manage what electronic forms and types of interactions are needed.

Accessing an electronic form is also challenging in certain situations. Generally, an application provides a graphical user interface to display the electronic form and support an interaction therewith. Various factors can limit how user-friendly this access is. For example, the smaller the size of the graphical user interface, the less user-friendly the access becomes. In another example, if a user has a physical impairment (e.g., visual) or a manual impairment (e.g., the user driving and unable to type on a smartphone), using the application to interact with the form via the graphical user interface can be difficult or even impossible.

SUMMARY

One exemplary embodiment involves proactively guiding user interactions with electronic forms via a computing device. The technique involves storing, by a form guidance engine, user information for interacting with electronic forms. The user information indicates how a user prefers to import, fill out, validate, or export electronic forms. The technique also involves storing, by the form guidance engine, state information for the electronic form for the user. The state information identifies whether the electronic form has not yet been imported, has been imported, has not yet been filled out, has been partially-filled out, has been filled out completely, has not been validated, has been validated, has not been exported, or has been exported by the user. The technique further involves detecting, by form the guidance engine, an occurrence of a triggering event for a potential interaction with the electronic form. In an example, the triggering event is detected based on the user information and the state information. Based on detecting the triggering event, the guidance engine presents a presentation configured to guide the user to perform a potential interaction with the electronic form via the computing device to change a current state of the electronic form to a new state. The form guidance engine also updates the state information of the electronic form to identify the new state based on a user response to the presentation. In this way, the user is proactively guided through one or more user interactions to complete the electronic form. The guidance is according to the user's preferences in one embodiment, for example, the user's preferences to complete forms as soon as possible, a specified time before deadlines, a specified time following a notification, etc., are used.

These illustrative features are mentioned not to limit or define the disclosure, but to provide examples to aid understanding thereof. These and additional features may be implemented independently in various embodiments or may be combined in yet other embodiments, further details of which can be seen with reference to the following description and illustrations. Advantages offered by one or more of the various embodiments may be further understood by examining the specification or by practicing one or more of the various embodiments.

BRIEF DESCRIPTION OF THE FIGURES

These and other features, embodiments, and advantages of the present disclosure are better understood when the following Detailed Description is read with reference to the accompanying drawings.

DETAILED DESCRIPTION

Figure 1:
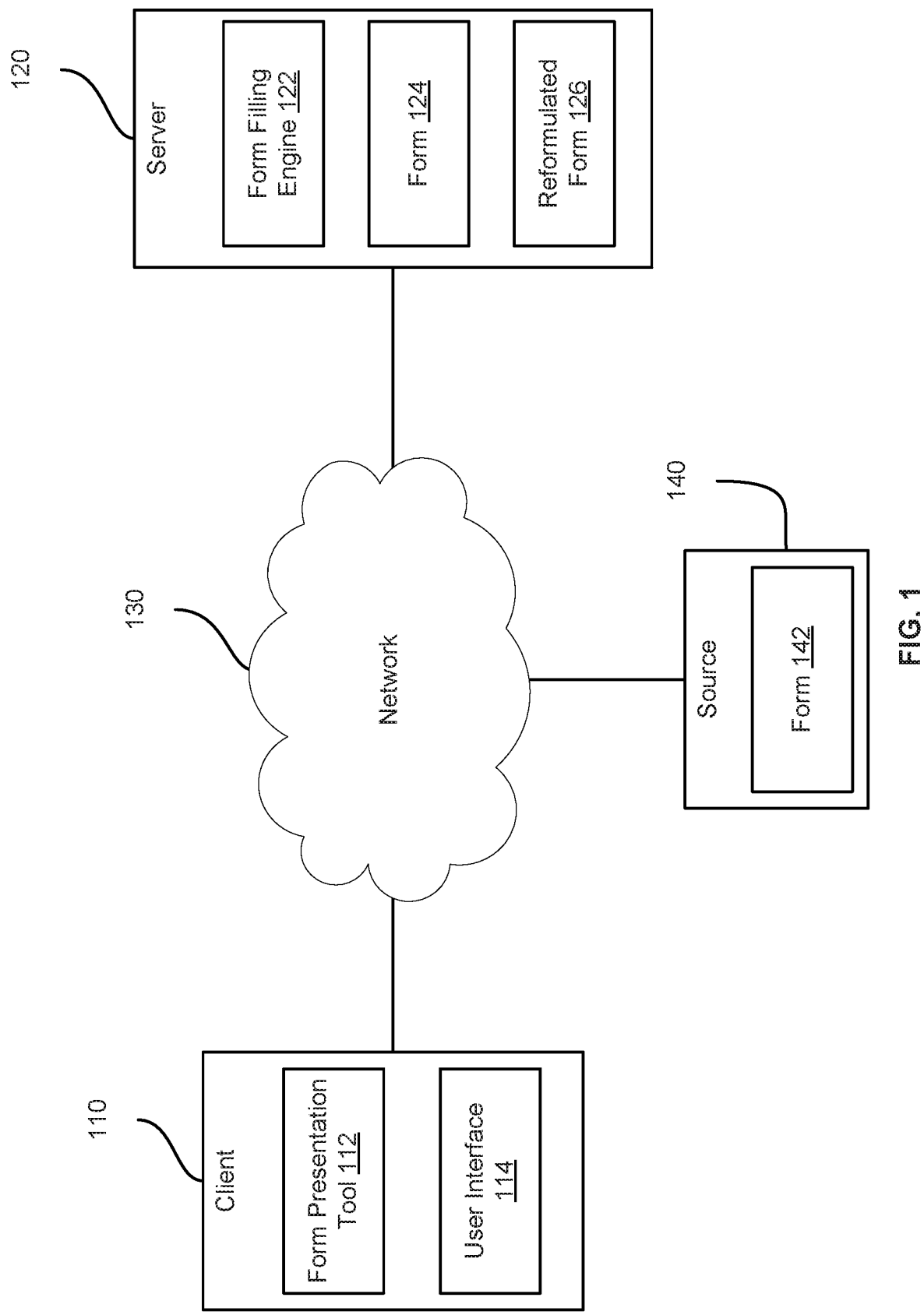
FIG. 1 illustrates an example of a computing environment for interacting with an electronic form, according to certain embodiments of the present invention.

Specific details of various exemplary embodiments of the present invention are set forth in the following description and are illustrated in FIGS. 1-8. The various embodiments described herein can be implemented in hardware, software, or a combination thereof. In the figures, similar symbols may identify similar components, unless context dictates otherwise. Certain well-known technology details, such as methods, apparatus, or systems that would be known by one of ordinary skill, are not set forth in the following description or in the figures to avoid unnecessarily obscuring the various examples. Those of ordinary skill in the relevant art will understand that they can practice other examples of the disclosed subject matter without departing from the scope and spirit of the present invention.

Generally, the embodiments described herein are directed to, among other things, improving accessibility to and interactions with an electronic form via a computing device of a user. Specifically, disclosed are methods, systems, and computer readable media that embody techniques for proactively anticipating a potential interaction of the user with the electronic form. The potential interaction reflects an interest of the user in the electronic form. In an example, a form guidance engine is configured to proactively anticipate the potential interaction and to guide the user to perform the potential interaction with the electronic form. Based on the user's anticipated interest, the form guidance engine generates a presentation that guides the user accordingly. The presentation is provided to the user via the computing device in an anticipatory and proactive way. For instance, the guided interaction is presented to the user prior to the user requesting information about the electronic form.

An interaction represents, for example, how the user accesses and utilizes the electronic form. A step or a combination of steps for importing, filling out, validating, or exporting the electronic form is an example interaction. A potential interaction with the electronic form represents a potential that the user has an interest in an interaction with the electronic form. An interest of the user represents, for example, a potential need, want, or desire of the user for interacting with the electronic form.

In one embodiment, proactively guiding user interactions with electronic forms is facilitated a form guidance engine that stores a profile of a user that includes user information such as the user's time preferences for filling out the form (e.g., as soon as possible, wait until two days before deadline, etc.) and information about forms for the user such as network locations of electronic forms for the user. The form guidance engine maintains state information about states of the electronic forms indicating, as examples, if the electronic form has not yet been imported, has been imported, has not been filled out, has been filed out partially, has been filled out completely, has not been validated, has been validated, has not been exported, and/or has been exported. Based on the user information and a state of an electronic form, the form guidance engine detects a triggering event that anticipates a potential interaction of the user with the electronic form. The form guidance engine accordingly guides the user to perform the potential interaction. For instance, if the user information shows that the user would like to fill out a particular electronic form as soon as possible and the state of that electronic form is that the electronic form has not yet been imported because it is not available, the form guidance engine automatically detects when the electronic form becomes available, anticipates that the user should download the electronic form in order to complete it as soon as possible, and, accordingly, prompts the user for a potential interaction that includes importing the electronic form now. Thus, without having to receive a user request to interact with the electronic form, the form guidance engine generates a presentation configured to guide the user to perform the potential interaction with the electronic form via the computing device. The presentation is based on the state of the electronic form. In the above example, if the electronic form has not been imported yet, the presentation asks the user whether the import should be performed. In another illustration, if the electronic form has been imported but not filled out yet, the presentation asks the user whether the fill out should be performed. The form guidance engine provides the presentation to the computing device of the user. Upon receiving a user response to the presentation, the form guidance engine performs an action specified in the user response and updates the state of the electronic form. Various benefits are also provided by using a touch-free modality (audible requests, voice responses, etc.) to guide user interactions with electronic forms.

To illustrate, consider an example of a user starting a new job. In this example, the form guidance engine anticipates that the user needs to fill out a W4 form. The form guidance engine identifies that the user is starting a new job. Prior to the user requesting the W4 form, the form guidance engine asks the user whether there is a desire to retrieve and fill out the W4 form. In this case, the user's response is negative. Accordingly, the W4 form is not downloaded. Instead, the form guidance engine monitors the job start date. Once the user starts the new job, the form guidance engine asks the user again about the W4 form. This time, the user's response is affirmative. As such, the form guidance engine downloads the W4 form, saves the form to the user's computing device, and provides a step-by-step process to fill out the different fields of the W4 form. Once complete, the form guidance engine anticipates that the user needs to email the W4 form (or a notification thereof) to a particular contact at the Human Resources (HR) department of the employer and to upload the W4 form to a folder on a shared volume. Prior to a user's request, the form guidance engine retrieves the email address of the HR contact and identifies the folder. The user is then simply asked to confirm whether the email should be sent out and the folder should be used. This example illustrates how the potential interactions are anticipated and guidance for downloading, filling out, and emailing, and uploading the W4 form is provided to the user in an anticipatory and proactive way.

In an embodiment, a form guidance engine is configured to anticipate the user's interest and provide the guided interaction. As used herein, the phrase "form guidance engine" refers to a computer-implemented component or process that anticipates potential interaction of a user with an electronic form and that, proactively and prior to a user request, provides a presentation to the user to guide the user with performing the potential interaction. A form guidance engine is provided on a server and accessed by a client device in one embodiment. In another embodiment, a workflow assistant is provided locally on a client device that the user uses to interact with an electronic form.

In an example, the form guidance engine anticipates the interest (or more generally the potential interaction) based on a state of the electronic form and on user information. The state of the electronic form represents, for example, a mode or condition that the electronic form is in relative to the user. For instance, the state of the electronic form indicates if the electronic form has been imported, filled out (partially or fully), validated, or exported for the user. On the other hand, the user information includes, for example, user preferences that define conditions for interacting with electronic forms. Various types of conditions exist. For example, a time-based condition indicates a deadline to move the electronic form to a next state or a length of time within which the electronic form can remain in a current state. For instance, a user preference specifies that a downloaded form should be filled out within two weeks after the download. In another example, a resource-based condition triggers an interaction once the electronic form is identified at, or becomes available from, a resource. For instance, a resource-based condition indicates that an email containing a link or a file attachment representing an electronic form should trigger an import of the electronic form.

Given the state of the electronic form and the user information, if a condition is met, then the form guidance engine is configured to provide a presentation specific to the state. The presentation guides the user's interaction with the electronic form. The presentation is provided in anticipation of the user's interest rather than in response to a user's request for information about the electronic form. For example, if an electronic form has not been previously downloaded and the user receives an email with a link to the electronic form, the form guidance engine proactively asks the user whether he or she would like to download or store the electronic form locally. In another example, if the electronic form has been merely downloaded and a related deadline is looming, the form guidance engine proactively asks the user whether he or she would like to fill out the electronic form.

In an example, the form guidance engine utilizes a state machine to provide the presentation. A state of the state machine corresponds to a state of the electronic form. Conditions from the user preferences, when met, are used as inputs to the state machine to transition between the states. In addition, user responses to presentations are used as inputs. An output of the state machine is used to generate the guided interaction for presentation to the user. By using the state machine, the form guidance engine facilitates guided interactions specific to the states.

In a further example, the form guidance engine ranks the different electronic forms based on the respective interests of the user. For instance, if a user is more likely to interact with a particular electronic form over another one, that particular electronic form is ranked higher. The form guidance engine solicits the user's interaction with the particular form prior to soliciting an interaction with the other electronic form.

Such a form guidance engine provides several advantages over existing techniques. For example, the form guidance engine can be agnostic of the type and the source of the electronic form. In other words, the form guidance engine manages interactions of the user with different types of electronic forms available from different sources. Thus, the form guidance engine retrieves electronic forms from different sources and, regardless of the types of these electronic forms, provide guided interactions therewith. In addition, the form guidance engine represents a single tool available to the user for interacting with the electronic forms at different states. In another example, the form guidance engine supports a proactive approach for anticipating the user's interests and soliciting user's responses, rather than being a passive form guidance engine that merely reacts to a user command. In other words, the form guidance engine represents an intelligent agent for interacting with the electronic forms. If implemented on a personal device, such as a smartphone, the form guidance engine provides a powerful personal assistant that guides the user's interaction with the electronic forms via the personal device. In yet another example, the form guidance engine improves accessibility to the electronic forms via the computing device. That is because the presentation guides the user's interactions. In another embodiment, the presentation uses a step-by-step approach that combines graphical and audible formats to improve accessibility and interactions in challenging situations. For instance, if the user has a physical or manual impairment, the form guidance engine uses a step-by step audio presentation and accepts vocal use responses, thereby avoiding the need of the user to access and interact with an electronic form via a graphical user interface. Different modalities for the user interactions with the electronic form are usable, including a touch-free modality.

As used herein, the phrase "modality" refers to a mode of providing output and/or receiving input on a device. Examples of output modalities include, but are not limited to, general modalities such as visual display or audio presentation modalities, and more specific modalities such as text based, menu-based, and question-based modalities. Examples of input modalities include, but are not limited to touch-based, physical keyboard-based, mouse-based, trackball based, Braille-based, hand gesture based, video recognition-based, eye gaze-based, switch control-based, and electroencephalogram (EEG) analysis-based modalities.

As used herein, the phrase "electronic form" refers to an electronic document for completion by someone filling out the electronic document with information that is expected to be placed at specific places on the electronic document. A portable document format (PDF) document with such specific information places is an example of an electronic form. A scanned image of the PDF document is also an example of an electronic form. Typically, an electronic form includes a template of fields and additional information added by one or more persons completing the electronic form. An electronic form will generally provide a way for the persons entering information to enter information in a consistent way so that a receiver of multiple instances of the completed form can read or extract information at particular locations on the electronic form and understand, based on the location, the information. Similarly, the use of fields at particular locations on electronic forms facilitates the interpretation of information entered onto the forms. An electronic form may, for example, have a name field and a recipient or analysis application may understand based on the location of the text added to the electronic form by a person completing the electronic form that the added text is the name of the person. The template of an electronic form can specify fields and field characteristics.

As used herein, the phrase "field" refers to a location in an electronic form or a portion of a form at which one or more items of information are entered when the electronic form is completed. Text boxes, Boolean graphics such as checkboxes, and signatures are examples of fields. A field has one or more field characteristics. Fields can be defined explicitly and identified expressly, for example, using metadata in the form. Fields that are not defined can be inferred, for example, using a recognition algorithm that uses appearance of certain graphical objects (lines, rectangles, circle, radio buttons, checkboxes, etc.) to identify locations as candidate fields where information is to be entered when the form is completed.

The phrase "state of an electronic form" refers to a mode or condition that the electronic form is in relative to a user of the electronic form. For instance, the state of the electronic form indicates if the electronic form has been imported, filled out, validated, or exported for the user. Some or each of the states can also include sub-states, such as not started, in progress, and completed sub-states.

The phrase "user information" refers to information about a user. Some of the user information is usable to anticipate an interest of the user to interact with an electronic form. Various types of information exists including personal user information, user preferences, user settings, and user-based conditions for interacting with the electronic form.

Turning to FIG. 1, that figure illustrates an example computing environment for interacting with electronic forms. As illustrated, a client 110 is in communication with a server 120 over a network 130 to receive guidance about interactions with electronic forms. The electronic forms can be of different types and can be available from different storage location 140. Although a client-server architecture is shown, the embodiments are not limited to a distributed implementation. Instead, the embodiments similarly apply to implementations where the various techniques are locally hosted and executed at the client 110.

The client 110 represents a computing device that a user operates to access and interact with electronic forms. For example, the user operates the client 110 to import, fill out, validate, and export electronic forms. The server 120 represents a computing system that proactively guides the user's accessibility to, and interactions with, the electronic forms. For example, the server hosts different computing components of the form guidance engine described herein above. The form guidance engine anticipates a potential interaction of the user with an electronic form based on a state of the electronic form and on user information. The potential interaction reflects a user interest to interact with the electronic form. Given the interest, the form guidance engine also causes the client 110 to present a guided interaction with the electronic form and to solicit user responses. The network 130 represents a data network that includes, for example, a public network (e.g., the Internet) and/or a private network (e.g., an intranet). The storage locations 140 represent different spaces where electronic forms 142 reside. Some of the storage spaces are accessible to the client 110 and/or the server 120 over the network 130. For example, such storage spaces include a server hosting an email inbox of the user, a server hosting a web site, and a network-based storage space (e.g., public or private cloud storage). Other storage spaces are local to the client 110 and/or the server 120. For example, disk of the client 110 and/or the server 120 can be part of the storage location 140.

Turning to the computing components of the server 120, these components include, for example, state information 122, user information 124, form guidance engine 126, and electronic forms 128. While the state information 122 and user information 124 generally represent data, the form guidance engine 126 represents a module configured to use the data and provide the guided interaction to the client 110. Each of these components is described herein next. For instance, the form guidance engine 126 maintains and monitors states of different electronic forms that are associated with a user. Depending on the state of each electronic form (e.g., an electronic form being active or inactive) and/or the user's interest (e.g., as derived from the user information 124), the form guidance engine 126 generates a presentation that asks the user whether he or she would like to interact with the electronic form via the client 110.

The state information 122 is stored in a data store associated with the server 120, such as at a local or remotely accessible storage space. For example, the state information 122 is stored in a database. As stored, the state information 122 provides information about different electronic forms. Such information can be stored for a particular user (e.g., a database is needed for each user) or for a plurality of users (e.g., a single database is used). For each electronic form, the state information 122 includes an identifier of the electronic form, a current state of the electronic form relative to a user (e.g., whether the electronic form is available to the user, is active, is inactive, has been imported, filled out, validated, exported, etc.), an identifier of the user, and an identifier of location of the electronic form on a storage space (e.g., a uniform resource locator (URL) of the electronic form).

Similarly, the user information 124 is stored in a same or different data store. The user information 124 provides information for interacting with electronic forms on behalf of users. Such information can be stored for a particular user or for a plurality of users and can be specific to a particular electronic form or generic to a plurality of electronic forms. In other words, the information is stored for one-to-one, one-to-many, many-to-one, and many-to-many associations between users and electronic forms. In an example, the user information for a particular user includes user personal information, user preferences, and information about resources associated with the user. The user personal information represents information that is personal to the user, such as the user's name, date of birth, etc.

The user preferences represent information about preferences of the user for interacting with electronic form(s). For example, the user preferences include time-based conditions for a particular interaction or for different types of interactions. To illustrate, the user preferences indicate how long an electronic form can remain in a certain state, a deadline to move the electronic form to another state, or a time of day to initiate an interaction. For instance, the user preferences specify that as soon as an electronic form becomes available from a storage location, the user should be requested whether an import is to be performed. Similarly, the user preferences also specify that two days before a related deadline, the user should be reminded to fill out an electronic form. Likewise, the user preferences specify that any interactions to validate or export an electronic form should be performed between 8:00 am and 10:00 am during the weekdays. In another example, the user preferences include resource-based conditions for a particular interaction or for different types of interactions. To illustrate, the user preferences indicate that once an electronic form becomes available from a network-based storage space, the user should be should be requested whether an import is to be performed.

The information about resources associated with the user identify the resources and includes, as needed, access authorizations (e.g., via tokens, certificates, username and password, etc.) to the resources. Various types of resources can be associated with a user. Generally, these resources relate to electronic forms. One resource type includes a computing service or a storage location that stores an electronic form. A network-based storage space (e.g., a cloud storage space) is an example of this type of resources. The information about the network-based storage space includes a token to access such a space and retrieve the electronic form. Another resource type includes a computing service or a storage location identifying that an electronic form is stored and available from another computing service or storage location. An email inbox of the user that receives an email with a link to an electronic form is an example of this type of resource. The information about the email inbox includes a user name and password to access the email from the inbox and follow the link to the electronic form.

The user information 124 is available from different sources. In an example, some of the user information 124 is available from a profile of the user. This profile can be tied to the client 110, to one or more applications hosted on the client 110, and/or to a subscription with the server 120 (e.g., with the form guidance engine 126). In another example, some of the user information 124 is predicted. The prediction is based on the history of the user and/or other users related to interacting with different electronic forms.

The form guidance engine 126 includes logic for using the state information 122 and the user information 124 to generate a presentation about a state of an electronic form. When presented to the user via the client 110, the presentation guides the interaction of the user with the electronic form.

To illustrate, consider the following example. The form guidance engine 126 monitors an email inbox of the user and determines that an email was received with a link to an electronic form. Based on the state information 122, the form guidance engine determines that the electronic form has not been downloaded yet. Based on the user information 124, the form guidance engine determines that the user should be requested whether the electronic form should be downloaded. Accordingly, the form guidance engine 126 causes a presentation at the client 110 about the electronic form and requests whether the download should be performed. If the user requests so, the predictive agent 112 downloads the electronic form and updates the state information 122 accordingly. The predictive agent 112 can also scan the body of the email to infer a deadline. This deadline can then be presented to the user for confirmation and entered into the state information. Further, the event scan be saved to an electronic calendar in the situation when the user is not utilizing the application when the event occurs; the calendar event can contain a link to the application itself with a self-reference to the form which is in turn provided to the application upon invocation.

In another illustration, consider the next example. The form guidance engine 126 monitors a network-based storage space and an electronic calendar of the user and determines that an electronic form is stored at that space and that a deadline to fill out the electronic form is looming. The form guidance engine 126 also determines that at least a portion of the electronic form has not been completed yet based on the state information 122. By looking up the user information 124, the form guidance engine 126 further determines that a time-based condition for filling out the electronic form is met. Accordingly, the form guidance engine 126 causes a presentation at the client 110 about the electronic form and requests whether the remaining blank portion should be filled out.

The server 120 also stores the electronic forms 128. In an example, the electronic forms 128 are saved in a data store (e.g., a database) accessible to the server 120. If an interaction with an electronic form should occur, the form guidance engine 126 retrieves the electronic form from the appropriate storage location 140 and stores a copy as part of the electronic forms 128. In an example, the user interaction via the client 110 utilizes the copy. For instance, filling out the electronic form represents filling out the copy. In another example, the form guidance engine 126 forwards the copy to the client 110 for storage thereat. In this example, the user interaction via the client 110 can utilize the local copy of the client 110.

Turning to the computing components of the client 110, these components include, for example, a form interaction agent 112, user information 114, electronic forms 116, and a user interface 118. Some or all of these components interface with some or all of the components of the server 120 to guide the user's interactions with electronic forms. Each of the components 112-118 is described herein next.

The form interaction agent 112 represents an instance or an interface to the form guidance engine 126. For example, the form interaction agent 112 represents a tool available to the user to input the user information 114 and to interact with electronic forms. Generally, the form interaction agent 112 presents a guided interaction about an electronic form received from the form guidance engine 126, receives a response of the user to the presentation, and provides the user response to the form guidance engine 126. As such, the form interaction agent 112 allows the user to import, fill out, validate, and export an electronic form following a step-by-step guided interaction.

The user information 114 includes some or all of the user information 124. In an example, the user information is entered by the user via the form interaction agent 112. In another example, the user information is received from the server 120. In yet another example, the user information 114 corresponds to a profile of the user. In turn, the profile is tied to the client 110 or to a particular application hosted on the client 110 (e.g., the form interaction agent) or on a resource associated with the user.

The electronic forms 116 represent local copies of electronic forms. As described herein above, interactions of the users can use the local copies. However, the interactions can also use the electronic forms 128 stored at the server 120.

The user interface 118 represents an interface for presenting the guided interaction. The presentation uses different input and output modalities. The user interface 118 includes, for example, a graphical user interface. The guided interaction involves a back and forth guided dialog via the graphical user interface. In another example, the user interface 118 includes an audio interface. In this example, the guided interaction uses an audio presentation to inform the user about the electronic form and accepts speech response from the user.

Hence, the computing environment of FIG. 1 supports guided interactions of users with electronic forms via computing devices. By maintaining state information about the electronic forms and user information about users, the guided interactions can be predictively and proactively provided to the users. In addition, the electronic forms need not be limited to one source or be of one type. Instead, the guided interactions are provided for electronic forms from different sources and of different types.

Figure 2:
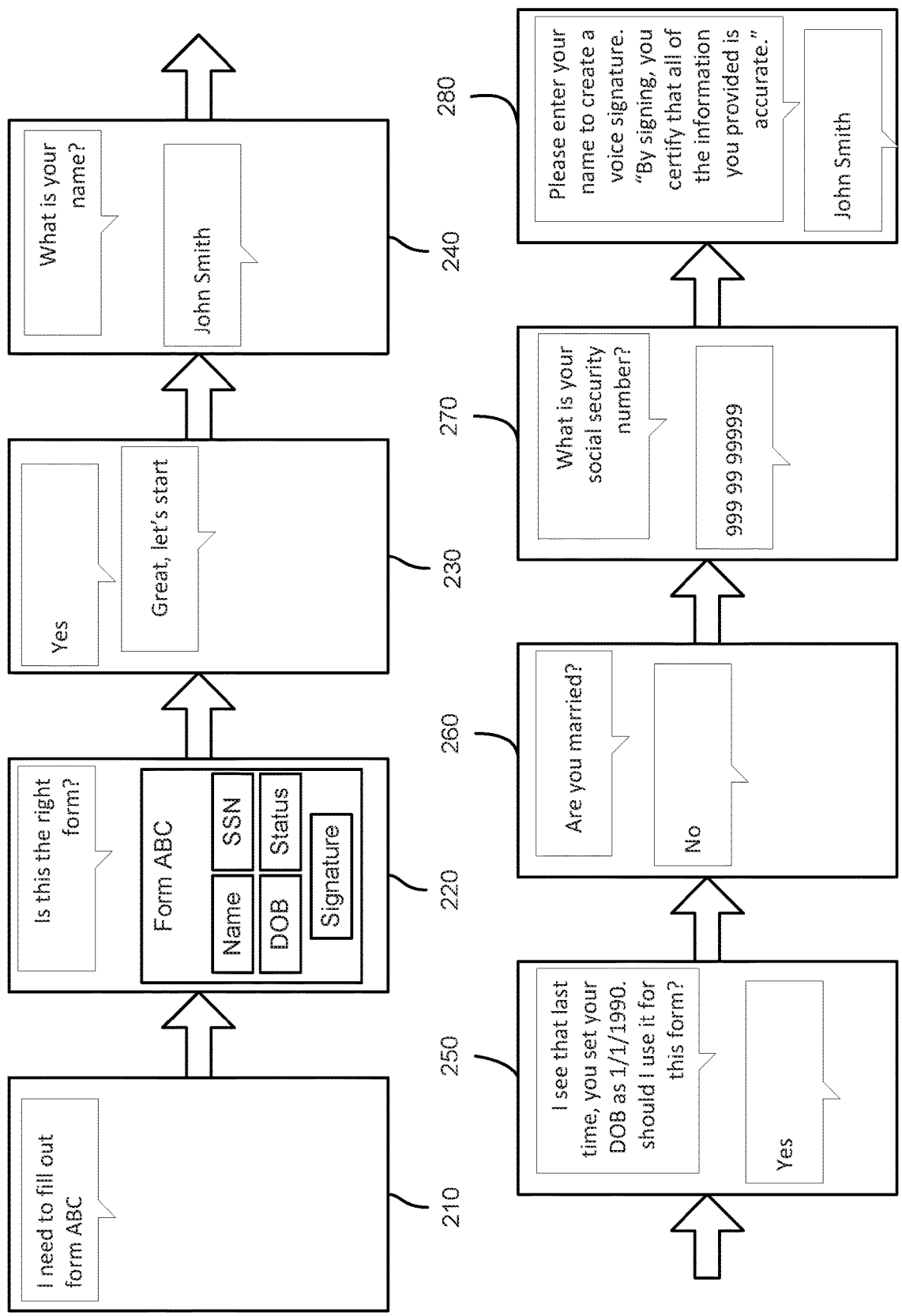
FIG. 2 illustrates an example interactive and guided dialog to interact with an electronic form, according to certain embodiments of the present invention.

Turning to FIG. 2, the figure illustrates guided interactions related to three states of an electronic form: import, fill out, and export. In the interest of clarity of explanation, an application is described in connection with the guided interactions. Such an application includes some or all of the components of the client 110 (e.g., the form interaction agent 112) and/or the server 120 (e.g., the form guidance engine 126) of FIG. 1.

As part of a first guided interaction 210, the application detects that a user received an email with an attached electronic form. If the state information indicates that the electronic form has not been imported yet, the application enters an import state. Accordingly, the guided interaction 210 proactively asks the user whether he or she likes to import the electronic form. If so, the electronic form is imported by, for example, copying the electronic form from the email to a folder of the user on a network-based storage space.

A second set of guided interactions includes guided interactions 220-250 and correspond to the fill out state. In particular, the application determines that the electronic form has been imported, but has not been filled out. Based on an anticipated interest of the user in filling out the form, the guided interaction proactively asks the user whether he or she would like to fill out the application. If so, the process of filling out the application form is initiated. A step-by-step approach is used to enhance the user experience.

For example, the application identifies personal user information based on the user information. The guided presentation 230 asks the user whether this information should be used. If so, the application prepopulates respective fields of the electronic form with the personal user information.

In a next step, the application identifies a field of the electronic form that needs input of the user. As such, the guided interaction 240 describes this field to the user and solicits the user's input. The application utilizes the user response to populate the field.

When the various fields of the application have been filled out, the application determines that the filling out process is complete. The guided interaction 250 informs the user of the completion and asks whether the electronic form should be saved. If so, the application saves the electronic form to another folder of the user. The application proactively identifies this folder from the user information. Additionally or alternatively, the application implements an auto-save mode. If so, the electronic form is auto-saved.

Once saved, the application set the state of the electronic form to, for example, fill out complete/export incomplete. After some time elapses, the application detects that the electronic form has not been exported yet. Accordingly, a third set of guided interactions 260 and 270 is provided.

The guided interaction 260 explains the application was saved, but has not been sent out despite the elapsed time. The guided interaction 260 also asks the user whether the export should be performed. If so, the application initiates the export process. In this example, the export includes sending the form to an email address.

The application proactively determines the email address. For example, the application uses the same email address of the sender of the original email or having scanned this original email for email addresses mentioned in the "to" or "cc" fields in the email header, or the contents of its body. The guided interaction 270 explains to the user how the email address was determined and asks the user if that is the proper email address. If so, the application attaches the electronic form to a new email and sends the new email to the sender.

In addition, the application predicts that the user has an interest in a second electronic form related to the first electronic form (e.g., the one that was sent). For example, the application determines that the sender had also emailed another electronic form that has not been imported, filled out, or exported yet. Once the second electronic form is identified and based on the state of this electronic form, the application proactively provides guidance to the user. As such, the application can also predict an interest in a particular electronic form based on interactions with other electronic forms. As illustrated in FIG. 2, if the second electronic form has not been downloaded yet, the application sets the state to import. Accordingly, a guided interaction 280 is proactively provided to the user to ask whether the import should occur.

Hence, the application proactively informs the user about an electronic form and solicits a user response to move the electronic form to a next state. At each state, the application ascertains as much information as possible about the electronic form and the user's interest to interact with the electronic form. Accordingly, the application guides the user in an interactive, simplified manner that improves the user experience and the accessibility to and interactions with the electronic form.

The guided interactions of FIG. 2 are illustrative. Other guided interactions are also possible. For example, upon a download of an electronic form from a source, a blank version of the electronic form is saved locally to the application. Future uses of the electronic form can be based on the local version. In another example, an electronic form is saved with a populated portion that can be reused over time (e.g., the portion containing personal user information such as a name). Future uses of the electronic form would include the pre-populated portion such that the user interaction with the electronic form is reduced.

Figure 3:
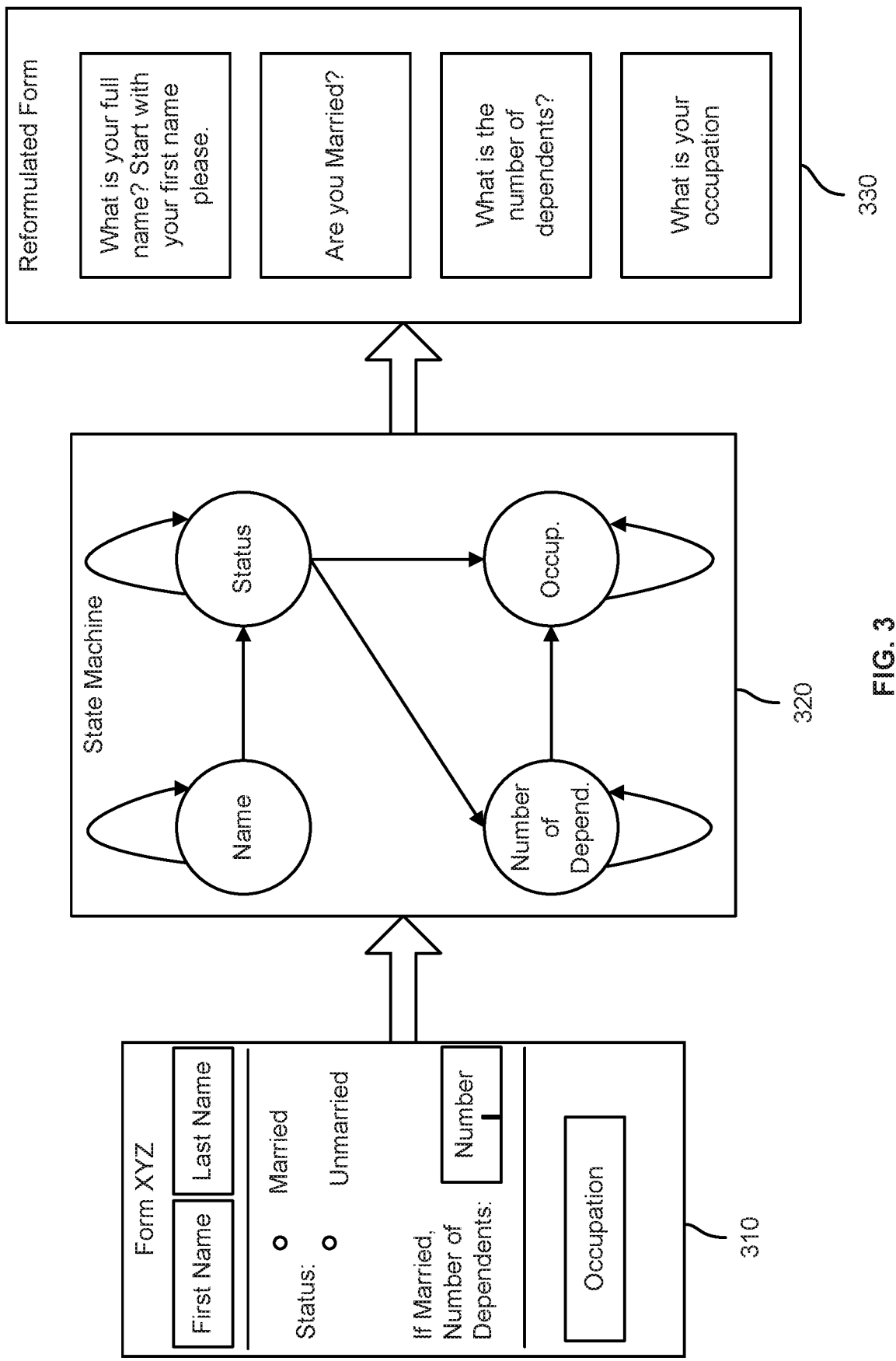
FIG. 3 illustrates an example diagram for interacting with an electronic form based on user information and a state of the electronic form, according to certain embodiments of the present invention.

Turning to FIG. 3, the figure illustrates an example diagram for generating various guided interactions about an electronic form given user information 310 of a user and state information 320 of the electronic form. The user information 310 and the state information 320 include some or all of the information of the user information 124 and the state information 122, respectively, of FIG. 1.

As illustrated, the user information 310 and the state information 322 are inputted to a form guidance engine 330, similar to the form guidance engine 126 of FIG. 1. The form guidance engine 330 implements a state machine 332 to output a guided interaction 340 about the electronic form. In an example, the state machine 332 is implemented as a multi-tier machine.

At a top tier, the state machine 332 defines various possible states of the electronic form, such as an active state including an import state, a fill out state, a validate state, and an export state. Other example states include an inactive state, such as the electronic form has been exported or is unavailable to the user. The state machine 332 also defines inputs to transition the electronic form from a current state to a next state. Multiple inputs can be defined for each state. For example, one input includes the user information 310 and the state information 320. Another input includes a user response 350 to a presentation about the state of the electronic form.

To illustrate, for an import state, the state machine 332 defines that an electronic form previously not imported should be imported if certain time-based or resource-based conditions are met. Accordingly, the guided interaction 340 is generated to confirm the user's interest in the import. If the user response 350 confirms the interest, the state machine 332 defines that the electronic form should be imported and that the state transitions to the fill out state.

At a lower tier and for each of the top-tier states, the state machine 332 defines a set of sub-states and possible transitions. In particular, each of the top-tier states corresponds to a set of actions that can be performed. Each of the actions can be mapped to a sub-state of the lower tier. For example, the import state includes identifying the source of the electronic form, accessing the source, retrieving the electronic form, and storing the electronic form at a particular storage location. Similarly, the fill out state includes pre-populating fields with known personal user information, populating each field in a one-at-a-time approach, and saving the filled out form. The validate state includes checking each populated field for proper input, requesting updates to erroneous inputs, and storing any updates. The export state includes identifying a destination of the export, transmitting the electronic form to the destination, and receiving a confirmation of the transmission. As such, for each of these actions, the state machine 332 also defines a corresponding state (e.g., a sub-state) and inputs for transitioning to a next sub-state. The inputs include the user information 310, the state information 320, and the user response 350. The guided interaction 340 is outputted as a function of the current sub-state and the respective inputs. Thus, the guided interaction 340 is customized to the specifics of the corresponding sub-state. Using states and transitions can be repeated at multiple lower tiers.

To illustrate, consider a fill out state and associated sub-states. In this illustrative example, the user information 310 indicates that an electronic form should be filled out in a particular time period. Further, the state information 320 indicates that the electronic form has not been filled out yet. Accordingly, the form guidance engine 330 predicts that the user is interested in filling out the form. At the lower tier, the state machine indicates that personal information fields should be pre-populated with available personal user information.

Accordingly, the form guidance engine 330 pro-populates such fields with data from the user information 310 and generates a guided interaction 340 that asks the user to confirm the personal information. If the user response 350 confirms the information, the sub-state of the electronic form is updated based on the state machine 332. In the next sub-state, blank fields are to be populated. Accordingly, the form guidance engine 330 generates guided interaction 340 describing these fields to the user and soliciting user responses 350. Based on the user responses 350, the fields are populated and the sub-state is updated. This process of generating guided interaction 340, receiving user responses 350, and updating sub-states is repeated until the electronic form is filled out and the state, at the top tier, is changed to a validate state.

In an example, the logic of the state machine 332 is implemented via simple state transition methods coupled with a simple script referencing those state transition methods (e.g., XML). The scripts are be stored in a file or database and read during initialization of the application, and easily updated as necessary.

Turning to FIGS. 4-7, the figures illustrate example flows for providing guided interactions. In the illustrative operations, each of the operations or functions may be embodied in, and fully or partially automated by, modules executed by one or more processors of a computing system. An example computing system is further illustrated in FIG. 8. In the interest of clarity of explanation, the computing system is described as performing the illustrative operations. Nevertheless, one of ordinary skill in the art would appreciate that the computing system can execute one more modules, such as a form guidance engine, a form interaction agent, and/or other modules, to implement one or more of the operations and/or one or more steps of the operations. Additionally, while the operations are illustrated in a particular order, it should be understood that no particular order is necessary and that one or more operations can be omitted, skipped, and/or reordered.

Figure 4:
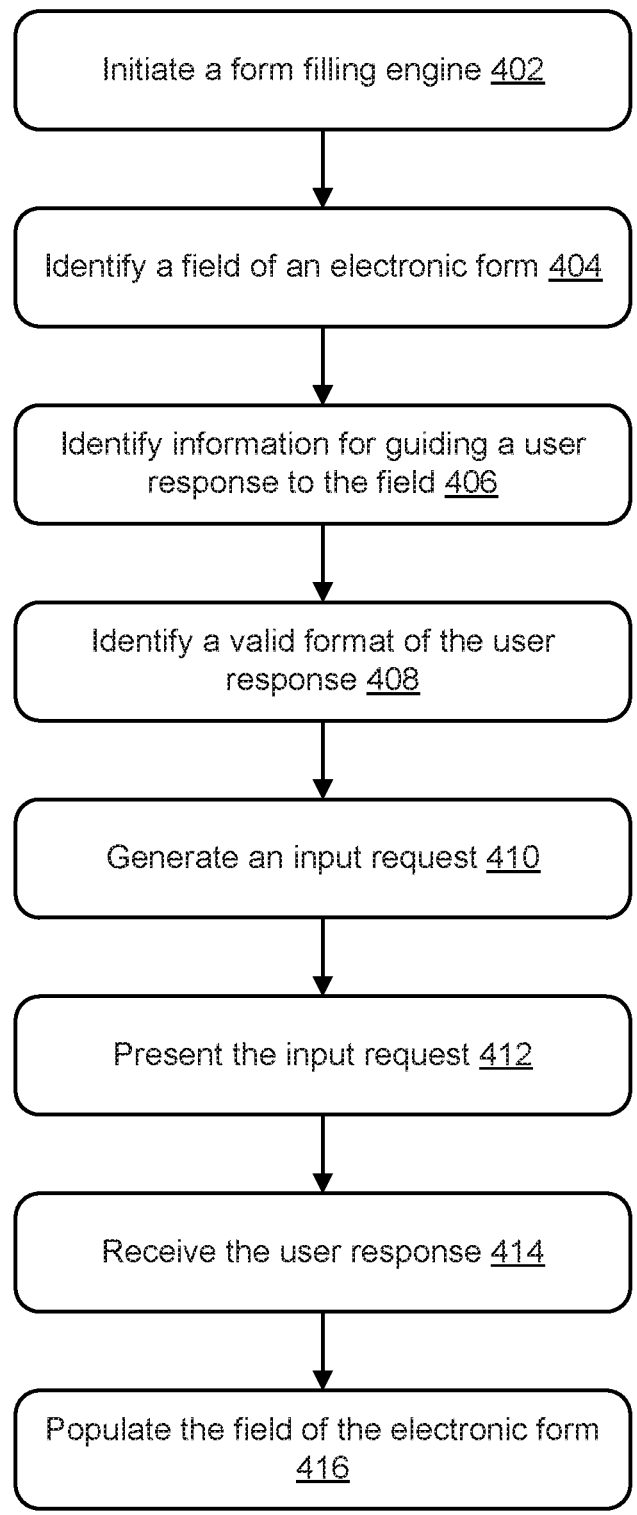
FIG. 4 illustrates an example flow for interacting with an electronic form, according to certain embodiments of the present invention.
Figure 5:
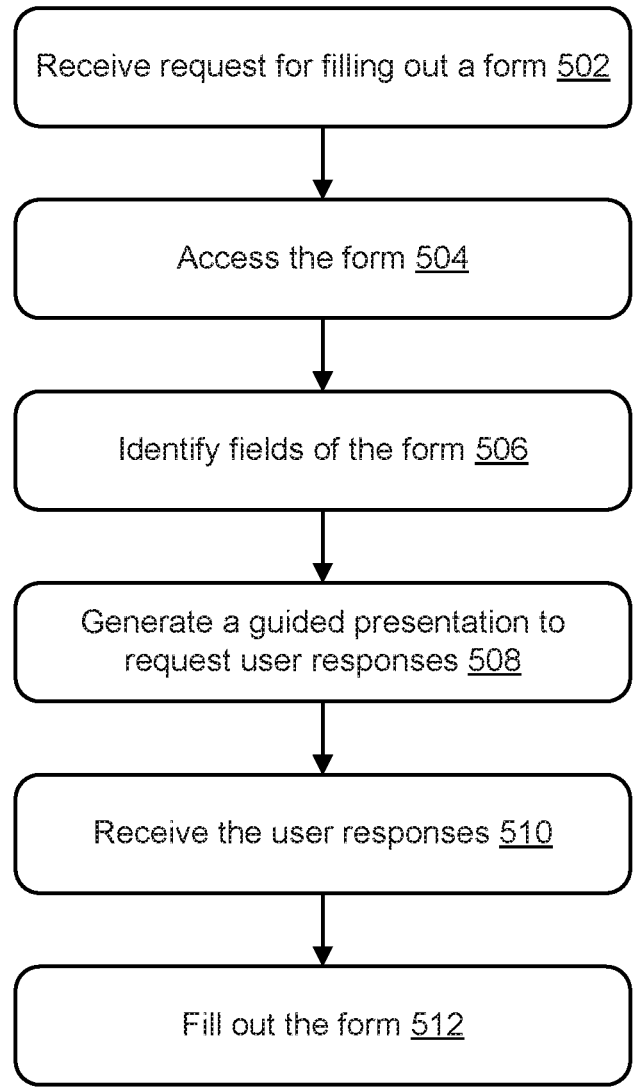
FIG. 5 illustrates an example flow for interaction with an electronic form based on user information and a state of the electronic form, according to certain embodiments of the present invention.
Figure 6:
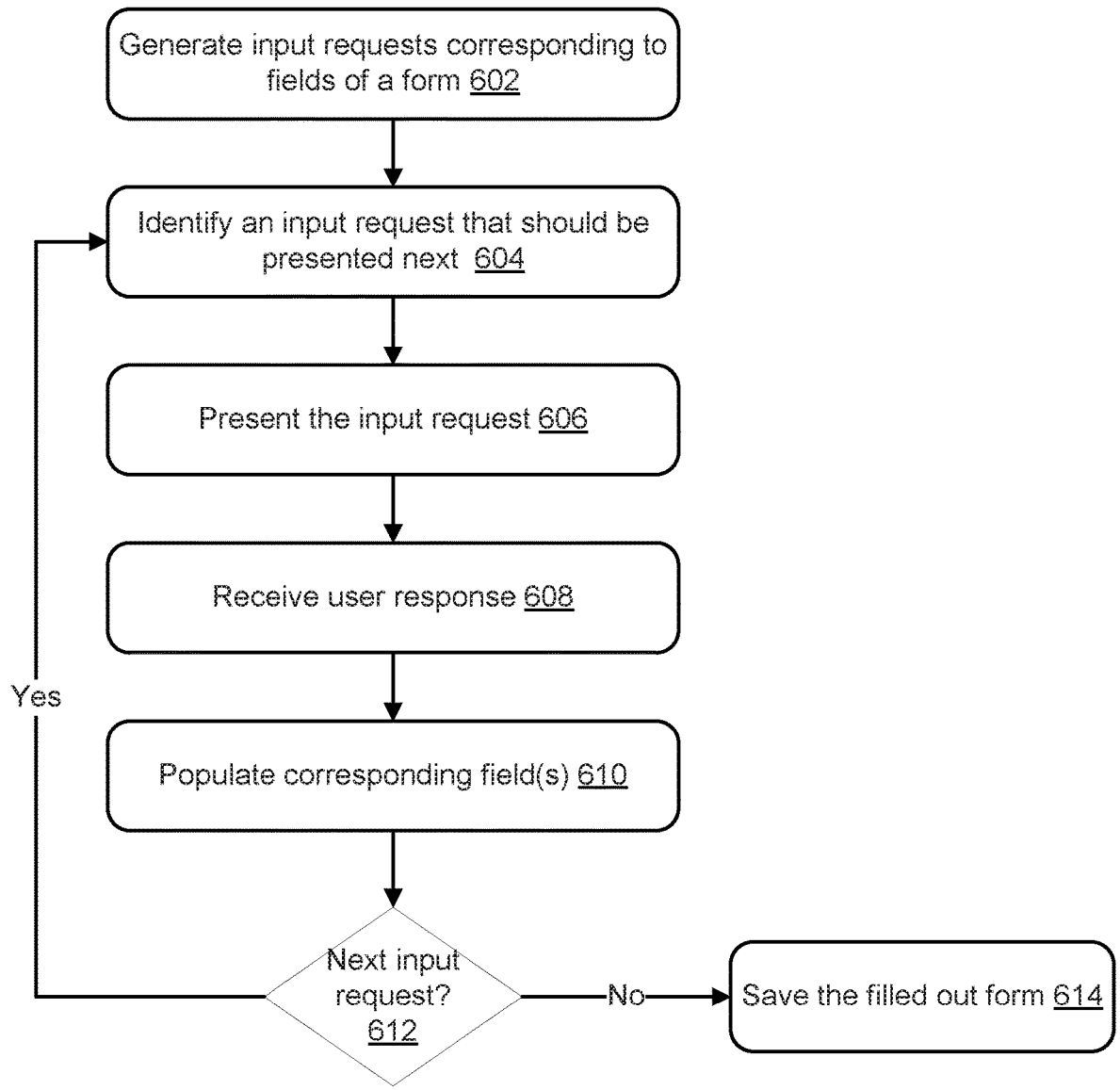
FIG. 6 illustrates an example flow for interacting with an electronic form based on a sub-state of the electronic form, according to certain embodiments of the present invention.
Figure 7:
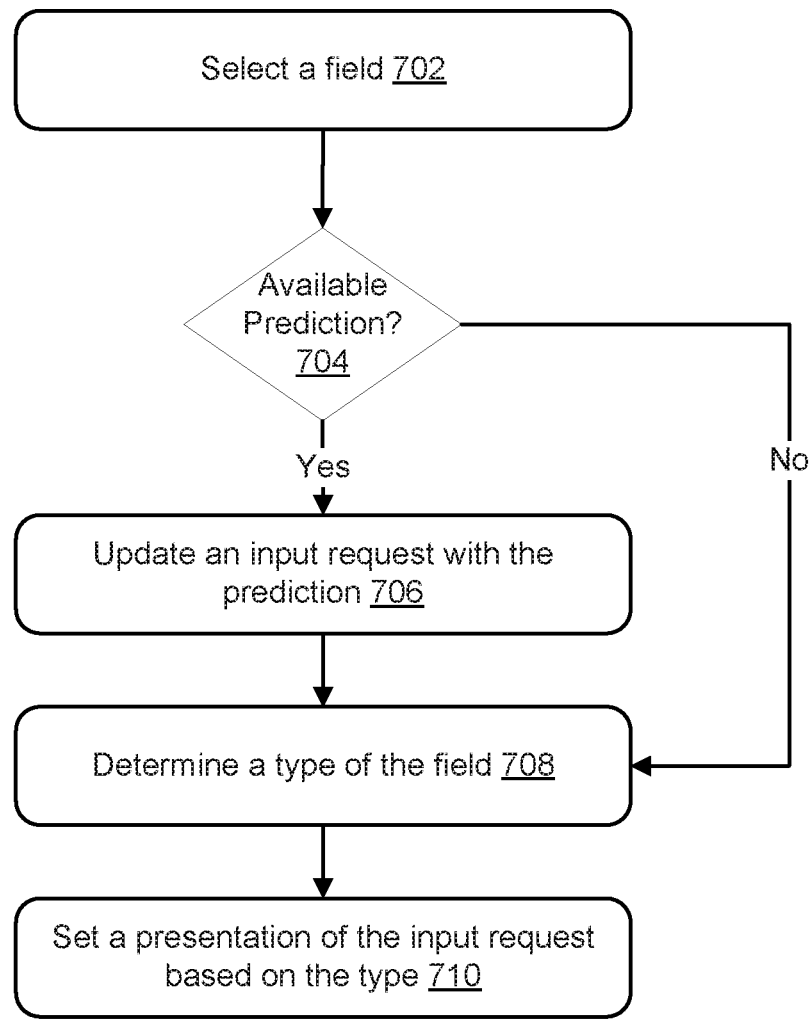
FIG. 7 illustrates an example flow for predicting user information, according to certain embodiments of the present invention.

FIG. 4 illustrates an example overall flow for providing guided interactions. Operations of the example flow of FIG. 4 may be further embodied in operations of example flows of FIGS. 5-7. As such, some operations of the example flows of FIGS. 4-7 may be similar. Such similarities are not repeated herein in the interest of clarity of explanation. FIG. 5 illustrates an example flow for using user information and state information to provide guided interactions. FIG. 6 illustrates an example flow for transitioning an electronic form between different states and sub-states in connection with providing guided interactions. FIG. 7 illustrates an example flow for predicting user preferences that can be used as part of the user information to provide guided interactions.

In the interest of clarity of explanation, the example flow of FIG. 4 is illustrated in connection with using a state of an electronic form. Nevertheless, the example flow similarly applies to using a sub-state of the state. FIG. 6 provides an example of using the sub-state. The example flow of FIG. 4 starts at operation 402, where a user profile is stored. Multiple user profiles can be stored for multiple users. For example, the computing system stores a user profile per user. The user profile includes user information for interacting with electronic forms. Such information is received from a computing device of the user and includes user personal information, user preferences, and conditions that when met trigger the computing system to anticipate potential user interactions with respective electronic forms.

At operation 404, where states of electronic forms are maintained. For example, the computing system stores the states in a data store. Each state corresponds to an electronic form and to a user. For instance, a state indicates whether an electronic form is active, inactive, has been imported, filled out, validated, or exported with respect to a particular user.

At operation 406, user information related to interactions with the electronic forms is maintained. For example, the computing system stores the user information in a same or a different data store. The user information is stored for a plurality of users. In some situations, the computing system receives the user information from computing devices of users based on inputs of such users. In other situations, the computing system predicts the user information, as illustrated in FIG. 7.

For each user, the corresponding user information generally relates to how the user interacts with electronic forms. That user information can be specific to an electronic form or generic to a plurality of electronic forms. Further, the user information can be specific to a state of an electronic form or generic to all states of the electronic form. For instance, the user information includes user personal information, user preferences, and information about resources associated with a user. The user personal information is usable, for example, to identify electronic forms to import, fill out portions of electronic forms, validate some populated fields of electronic forms, and identify destinations to export electronic forms. The user preferences include, for example, time-based conditions for triggering an interaction with an electronic form. The information about resources include, for example, resource-based conditions for triggering the interaction when the electronic form becomes available from, or is identified at, a resource.

At operation 408, a potential interaction of a user with an electronic form is anticipated based on user information and state information. The potential interaction reflects an interest of the user to interact with the electronic form. The interest, and more generally the potential interaction, can be identified for a particular state of an electronic form associated with the user. For example, the computing system determines the state from the state information. The computing system also determines whether, given the state, the user would be interested in interacting with the electronic form. For example, the computing system detects a triggering event based on the user information and the state information. For instance, if a condition from the user information is met given the state, the computing system determines that the triggering event occurred and, thus, the interest exists and/or the potential interaction is likely to also occur.

In an example, interests (e.g., potential interactions) in multiple electronic forms are determined. In this example, different techniques can be implemented to schedule the user interaction with the electronic forms in an ordered fashion. Generally, the order of the user interaction follows priorities assigned to the electronic forms. The higher the potential of an interaction, the higher the priority of the electronic form is. A user interaction with a higher priority electronic form is scheduled and solicited prior to that of a lower priority electronic form. In one example technique, a first in, first out (FIFO) queue is used. In this technique, the priority of the electronic form is a function of the position of the electronic form in the queue. As such, an interest in a particular electronic form determined prior to that of another electronic form results in a relative higher priority of the particular electronic form. This priority results in soliciting the user interaction with the particular electronic form prior to the user interaction with the other electronic form. In another example technique, the priority is based on a number of parameters, such as user settings, form state, etc. The parameters can indicate a user interest. The higher the interest in an electronic form (e.g., the more likely the user interaction), the higher the priority is for that electronic form. For instance, the following descending order of priorities can be used: continue processing an existing electronic form until fully completed, check electronic forms that were auto-saved but not saved, electronic forms with deadlines less than a day away, new un-imported electronic forms, partially filled out electronic forms, electronic forms with deadlines less than three days away (or some other number depending on a user setting), electronic forms not yet exported, etc.

At operation 410, a presentation about the electronic form is generated and provided to the user prior to receiving a request from the user for information about the electronic form. The presentation guides the interaction of the user with the electronic form given the state thereof. For example, the computing system generates a guided interaction given the state and transmits the guided interaction for presentation at a computing device of the user. The guided interaction presents information about the state of the electronic form and solicits the user to respond with an input related to interacting with the electronic form given the state. For instance, if the state is an import state, the guided interaction identifies the electronic form, describes that the electronic form is available for import, and requests whether the electronic form should be imported. In another illustration, if the state is a fill out state and a sub-state indicates that the electronic form has been partially filled out, the guided interaction identifies the electronic form, the filled out portion, and the remaining portion and requests whether the remaining portion should be filled out.

At operation 412, a user response to the presentation is received. For example, the computing system receives the user response from the computing device of the user. The user response indicates, given the presentation, an action that should be taken with respect to the electronic form. For instance, if the presentation requests whether the electronic form should be imported, the user response permits or denies the import. In another illustration, if the presentation requests information to populate a particular field, the user response includes the information.

At operation 414, an action related to the electronic form is performed and the state of the electronic form is updated based on the user response. For example, the computing system determines that the user response contains information about the action. Accordingly, the computing system performs the action and updates the state to a next state as applicable. For instance if the user declines to interact with the electronic form, the state is updated to decline. Based on different parameters (e.g., a time period that elapses), the user is asked again if he or she would like to interact with the electronic form. In another illustration, if the state is an import state and the user response confirms the import, the computing system imports the electronic form and updates the state to a fill out state. In another illustration, if the state is a fill out state and the user response specifies information for populating a field, the computing system populates that field and, as applicable, updates the state to a validate state.

Turning to FIG. 5, the figure illustrates another example flow for interacting with an electronic form. In comparison to FIG. 4, the example flow of FIG. 5 illustrates how a user preference and a resource associated with a user are used to anticipate the user's potential interaction (e.g., interest to interact) and accordingly interact with the electronic form.

The example flow of FIG. 5 starts at operation 502, where user information of the user is accessed. For example, the computing system identifies the user via an Internet protocol (IP) address of the user's computing device or via a username. Based on the user's identifier, the computing system looks up a data store storing information for a plurality of users to determine the user information of the user.

At operation 504, a user preference related to interacting with electronic forms is identified based on the user information. For example, the computing system identifies the user preference from the user information. The user preference indicates how the user prefers to interact with the electronic form.

At operation 506, a resource associated with the user is identified based on the user information. For example, the computing system identifies the resource from the user information. The resource stores the electronic form or indicates that the electronic form is available from another resource. The user information includes information about how the resource should be used in connection to interacting with the electronic form.

At operation 508, a condition for interacting with the electronic form is determined based on the user preference and/or the resource. The condition, when met, identifies a particular action that should be performed as part of interacting with the electronic form. For example, the computing system identifies a time-based condition and/or a resource-based condition from the user preference and the information about the resource. The time-based condition specifies when the action should be performed. The resource-based condition specifies how the resource should be used to perform the action.

At operation 510, the condition is determined as being met. For example, the computing system determines that the time-based condition is met given different time parameters. To illustrate, if the time-based condition specifies that the electronic form should be filled out two weeks prior to a deadline, the computing system compares the current time to the deadline and detects that the two-week condition is met. In another example, the computing system determines that the resource-based condition is met given an association between the electronic form and the resource. To illustrate, if the resource-based condition specifies that the electronic form should be imported when the electronic form becomes available from the resource, the computing system determines that this condition is met based on the availability of the electronic form relative to the resource.

At operation 512, a state of the electronic form is determined. For example, the computing system identifies the state from state information available from a data store. In certain situations, the condition is specific to the state. In other words, the action (that the condition identifies) is performed only if the electronic form is in the particular state. For instance, if the condition specifies that the electronic form should be imported given a certain time or resource-based condition, the import is performed only when the condition is met. In other situations, the condition is generic to all states. As such, the action is performed regardless of the state. However, the action itself depends on the state. For instance, if the condition specifies that an interaction should occur as soon as the electronic form becomes available from the resource, the electronic form is imported, filled out, validated, or exported if the state is an import state, a fill out state, a validate state, or an export state, respectively.

At operation 514, a presentation is provided. The presentation guides the interaction of the user with the electronic form given the state. For example, the computing system provides a guided interaction to the user's computing device for presentation thereat. The guided interaction includes the action specified by the condition and applicable to the state.

At operation 516, the action is performed and the state of the electronic form is updated, as applicable, based on a user response to the presentation. For example, the computing system receives the user response from the computing device. The user response includes information that enables the computing system to perform the action. For instance, if the user response permits an import, the electronic form is imported. In another illustration, if the user response includes information for populating a field of the electronic form, the field is populated accordingly.

As described herein in connection with FIGS. 4 and 5, these figures illustrate example flows for proactively guiding the interaction of the user given based on a state of the electronic form. These flows similarly apply for also proactively guiding the interaction of the user based on a sub-state of the state. FIG. 6 illustrates an example of how the sub-state is used for the user guidance.

The example flow of FIG. 6 starts at operation 602, where a state of the electronic form is determined. For example, the computing system identifies the state from the state information. At operation 604, a sub-state of the electronic form within the state is determined. For example, the computing system identifies the sub-state from the state information.

At operation 606, guided interaction is provided to the user. The guided interaction is based on the sub-state and solicits a user response that allows a transition of the electronic form to a next sub-state. Acceptable user responses and transitions to a next sub-state are defined in a state machine of the electronic form. In an example, the computing system generates the guided interaction by anticipating the user's interest in the interaction. As described in connection with FIGS. 4 and 5, the user's interest is anticipated from the user information by, for instance, determining that a condition identifiable from the user information is met. The computing system customizes the guided interaction according to the sub-state. As described herein above, the state corresponds to a set of actions that can be performed (e.g., for an import state, the actions include identifying the source of the electronic form, accessing the source, retrieving the electronic form, and storing the electronic form at a particular storage location). The sub-state corresponds to one of the actions. In the guided interaction, the computing system describes the corresponding action and requests the user to provide information for performing the action. For instance, in the "identifying the source" sub-state of the import state, the guided interaction identifies the source to the user and requests whether the user approves a download of the electronic form from the source. Once generated, the computing system transmits the guided interaction for presentation at the user's computing device.

At operation 608, the user response to the guided interaction is received. For example, the computing system receives the user response from the user's computing device based on the presentation of the guided interaction thereat. At operation 610, a determination is made as to whether the electronic form can be transitioned to the next sub-state given the user response. For example, the computer system determines whether the user response includes the appropriate information to perform the action and transition to the next sub-state as defined in the state machine. If so, operation 614 is performed, where the action is performed and the state is updated. Otherwise, operation 612 is performed where a determination is made as to whether additional guided interaction should be provided to the user.

At operation 612, the computing system determines, for example, whether the user would benefit from the further additional guided interaction. That determination is made based on the user response. If the user response includes unusable information, the computing system generates the additional guided interaction to explain the reason for the user response being unusable and to solicit another user response. The additional guided interaction is provided by performing operation 606. To illustrate, consider an example where the guided interaction requests an entry to a text field of the electronic form. If the user response includes a numeric entry, that response is unusable. Accordingly, the additional guided interaction explains that the user response included a numeric entry and that the field necessitates a text entry. The additional guided interaction also requests another user response that consists of a text entry. On the other hand, if the user response includes usable information, the usable information indicates that the user does not need additional guidance. As such, the computing system does not generate the additional guided interaction. Instead, operation 602 is performed to restart the interaction at a later time. To illustrate, consider the same example where the guided interaction requests the entry to the text field. If the user response includes a command to exit the form fill out process, this process is exited and revisited at a later time.

At operation 614, the computing system updates, for example, the sub-state to the next sub-state. To do so, the computing system performs the action based on the user response. Once the action is complete, the computing system transitions the electronic form to the next sub-state as defined by the state machine.

At operation 616, a determination is made as to whether the electronic form should be transitioned to the next state. For example, the state machine defines whether that transition is possible. If the action performed at operation 614 is the last action in the set of actions defined for the state or, conversely, if the user response corresponds to an input to the state machine that allows the transition, the computing system changes the state of the electronic form to the next state as illustrated at operation 618. Otherwise, operation 606 is performed such that additional guidance is provided to the user to move to the next sub-state.

As described in FIGS. 4-6, a presentation that guides the interaction of the user with the electronic form is proactively provided at a state level and/or a sub-state level by anticipating the user's interest in the electronic form. The user's interest can be anticipated from the user information. In an example, some or all of the user information is stored in the data store based on user input (e.g., based on a user profile that the user created). In another example, some or all of the user information is predicted and stored in the data store. FIG. 7 illustrates an example flow for predicting the user information.

The example flow of FIG. 7 starts at operation 702, where interactions of users with electronic forms are tracked. For example, the computing system tracks the types and timing of interactions, what guided interactions were provided and what user responses were received, and/or other interaction-related information. The tracking can be performed per electronic form, per group of electronic forms, per user, and/or per group of users. The computing system stores the tracked information in a data store.

At operation 704, a history of interactions is analyzed. For example, the computing system accesses the tracked information from the data store to perform the analysis. Generally, the analysis includes pattern recognition techniques for predicting user information given the history. For example, the analysis applies a machine learning algorithm or a regression model to the tracked information. In an example, the analysis is customized to a particular user or to a particular electronic form by considering the history that relates only to that user or the electronic form. In another example, the analysis is generic to a group of users or a group of electronic forms.

At operation 706, user information for a particular user is determined. The user information relates to interactions of the user with electronic forms. In an example, the computing system predicts the user information from the analysis of the interaction history. Different types of predictions for different types of the user information are possible. For example, a prediction can be made for personal user information from past inputs of the particular user across various electronic forms. In another example, a user preference for interacting with a particular electronic form is predicted from past interactions of the user or of a plurality of users. The plurality of users can share common attributes with the particular user. The common attributes are identified from corresponding personal user information. Further, the past interactions can relate to the same particular electronic form or to other electronic forms. For example, these other electronic forms are available from a same source, relate to a similar subject matter, or include common fields. In yet another example, a user preference for interacting with an electronic form given a particular state or sub-state is predicted from past interactions that correspond to that particular state or sub-state. Likewise, information about resources associated with the user is predicted from past interactions of the user, where these past interactions involve the resources.

To illustrate, consider an example of a tax form to be filled out for a current year. The user filled out the tax form last year. As such, personal user information such as the user's name, date of birth, and social security number are predicted from the past tax form. Interactions of users located in the same geographic region as the user, with similar incomes, or perhaps employed by the same employer are analyzed. These interactions relate to when and how the users filled out the tax form over the years. The analysis indicates that the users typically fill out the electronic form within the first month of the year. As such, a prediction is made that a user preference would be to fill out the form within that first month. In addition, the analysis indicates that the users typically download the tax form from a particular public web site. As such, a prediction is made that the tax form for the current year can be imported for the user when it becomes available from the public web site.

Figure 8:
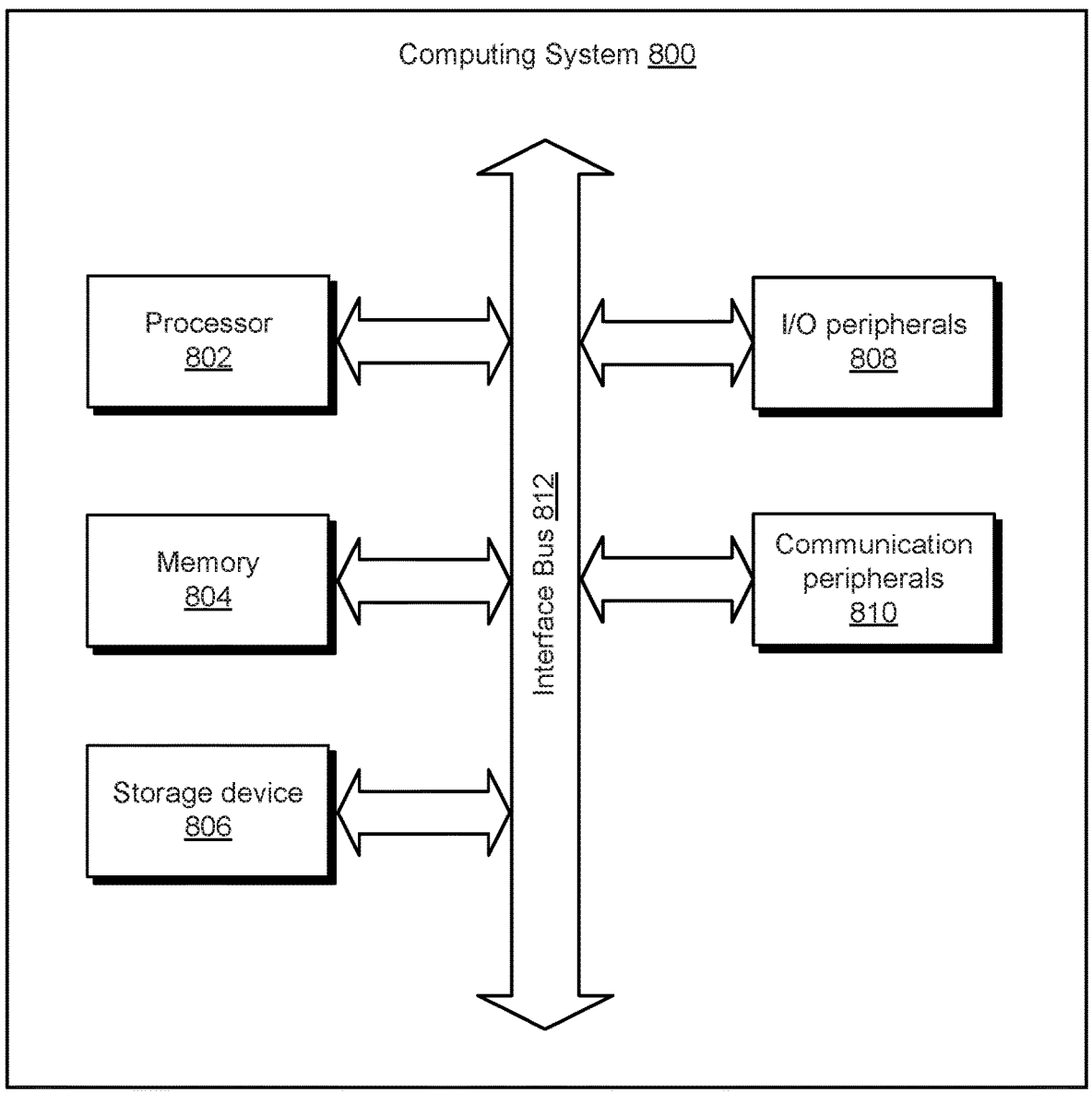
FIG. 8 illustrates example components of a computing system, according to certain embodiments of the present invention.

Turning to FIG. 8, the figure illustrates example components for implementing some or all of the components of the server 120 and/or the client 110 of FIG. 1. Although the components are illustrated as belonging to a same computing system 800, this system can be distributed.

The computing system 800 includes at least a processor 802, a memory 804, a storage device 806, input/output peripherals 808, communication peripherals 810, and an interface bus 812. The interface bus 812 is configured to communicate, transmit, and transfer data, controls, and commands among the various components of the computing system 800. The memory 804 and the storage device 806 include computer readable storage media, such as RAM, ROM, electrically erasable programmable read-only memory (EEPROM), hard-drives, CD-ROMs, optical storage devices, magnetic storage devices, electronic non-volatile computer storage, for example Flash® memory, and other tangible storage media. Any of such computer readable storage media can be configured to store instructions or program codes embodying aspects of the disclosure. The memory 804 and the storage device 806 also include computer readable signal media. A computer readable signal medium includes a propagated data signal with computer readable program code embodied therein. Such a propagated signal takes any of a variety of forms including, but not limited to, electromagnetic, optical, or any combination thereof. A computer readable signal medium includes any computer readable medium that is not a computer readable storage medium and that can communicate, propagate, or transport a program for use in connection with the computing system 800.

Further, the memory 804 includes an operating system, programs, and applications. The processor 802 is configured to execute the stored instructions and includes, for example, a logical processing unit, a microprocessor, a digital signal processor, and other processors. The memory 804 and/or the processor 802 can be virtualized and can be hosted within another computing system of, for example, a cloud network or a datacenter. The input/output peripherals 808 includes user interfaces such as a keyboard, screen, microphone, speaker, other input/output devices, and computing components such as graphical processing units, serial ports, parallel ports, universal serial bus, and other input/output peripherals. The input/output peripherals 808 are connected to the processor 802 through any of the ports coupled to the interface bus 812. The communication peripherals 810 are configured to facilitate communication between the computing system 800 and other computing devices over a communications network and include, for example, a network interface controller, modem, wireless and wired interface cards, antenna, and other communication peripherals.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms, furthermore, various omissions, substitutions and changes in the form of the methods and systems described herein may be made without departing from the spirit of the present disclosure. The accompanying claims and their equivalents are intended to cover such forms or modifications as would fall within the scope and spirit of the present disclosure.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

The invention claimed is:

1. A computer-implemented method for proactively guiding user interactions with electronic forms via a computing device, the computer-implemented method comprising:
   storing, by a form guidance engine, user information comprising a preference of a user that indicates a time period in which changes to a target state are to be completed for electronic forms;
   verifying that an electronic form is available on a data source accessible to the form guidance engine;
   storing, by the form guidance engine, state information for the electronic form, the state information identifying a current state of the electronic form, the current state corresponding to at least one of (a) an import of the electronic form into a storage location in which the electronic form is editable by the computing device associated with user, (b) a degree of completion of the electronic form, (c) a validation of the electronic form, or (d) an export of the electronic form from the computing device to a target device;
   detecting, by the form guidance engine and from the stored state information of the electronic form, a triggering event for a potential interaction of the user with the electronic form via the computing device, the triggering event comprising that (a) a current time is within the time period from the preference in the user information and (b) a change in state to the target state has not occurred within the time period as of the current time;
   based on detecting the triggering event:
      identifying, by the form guidance engine, an action that updates content of the electronic form and thereby causes a change from the current state to the target state of the electronic form, and
      initiating, by the form guidance engine, a presentation of a guided interaction interface that is separate from the electronic form and that is configured to guide the user to perform the action via the computing device; and
   updating, by the form guidance engine and based on a user response to the presentation, the state information of the electronic form to identify the target state.

2. The computer-implemented method of claim 1, further comprising:
setting, in response to verifying that the electronic form is available on the data source accessible to the form guidance engine, the current state of the electronic form to a value indicating that the electronic form is an available for importing to the computing device, wherein the presentation of the guided interaction interface comprises a prompt to import the electronic form;
receiving, responsive to the prompt to import the electronic form, a command to import the electronic form;
importing, by the form guidance engine, the electronic form from the data source based on receiving the command to import the electronic form; and
updating the current state of the electronic form to an imported state.

3. The computer-implemented method of claim 2, further comprising performing, by the form guidance engine, additional operations comprising:
receiving, prior to setting the current state of the electronic form is set to an available state, an electronic communication having a link to the electronic form; and
determining that the electronic form is not stored on the computing device, wherein the prompt to import the electronic form is included in the presentation of the guided interaction interface based on the electronic form not being stored on the computing device.

4. The computer-implemented method of claim 1, wherein the preference that indicates the time period in which changes to the target state are to be completed comprises a user preference associated with electronic form completion, wherein storing the state information comprises detecting that at least a portion of the electronic form has not been filled out and setting the current state to an incomplete state, wherein detecting the triggering event comprises determining that the portion of the electronic form should be filled out within the time period, and wherein the presentation of the guided interaction interface comprises a prompt to fill out the portion of the electronic form.

5. The computer-implemented method of claim 4, wherein the user response indicates that the portion of the electronic form should be filled out, and further comprising:
providing, by the form guidance engine to the computing device, a step-by-step guidance to fill out the portion of the electronic form.

6. The computer-implemented method of claim 1, wherein the preference that indicates the time period in which changes to the target state are to be completed comprises a user preference associated with electronic form validation, wherein storing the state information comprises detecting that the electronic form has not been validated and setting the current state to a non-validated state, wherein detecting the triggering event comprises determining that the electronic form should be validated within the time period, and wherein the presentation of the guided interaction interface comprises a prompt to validate the electronic form.

7. The computer-implemented method of claim 1, wherein:
storing the state information comprises detecting that the electronic form has not been exported and setting the current state to a value indicating that the electronic form has not been exported,
detecting the triggering event comprises determining that the electronic form should be exported within the time period,
the presentation of the guided interaction interface comprises a prompt to export the electronic form, and
the computer-implemented method further comprises performing, by the by the form guidance engine, operations comprising:
receiving, as at least a portion of the user response, a command to export the electronic form,
implementing the command to export the electronic form by transmitting the electronic form to an electronic address associated with one or more of a different user or a different computing device.

8. The computer-implemented method of claim 7, further comprising performing, by the form guidance engine, additional operations comprising:
identifying the electronic address by analyzing an electronic communication having a link to the data source;
including, in the presentation of the guided interaction interface, a prompt to confirm that the electronic address as a destination for exporting the electronic form; and
receiving, as at least an additional portion of the user response, a confirmation of the electronic address as the destination for exporting the electronic form, wherein the electronic form is transmitted to the electronic address based on receiving the confirmation.

9. The computer-implemented method of claim 1, wherein a touch-free modality is used for the presentation and the user response, wherein the touch-free modality provides the presentation via audible requests and interprets a voice response of the user using voice recognition.

10. The computer-implemented method of claim 1, further comprising performing, by the form guidance engine and prior to storing the user information, additional operations comprising:
accessing a history of user interactions with other electronic forms;
determining, from the history of user interactions, times of completion of the other electronic forms;
computing the preference of the user from the times of completion of the other electronic forms; and
adding the computed preference to the user information.

11. A system comprising:
a processor;
a memory communicatively coupled to the processor and bearing instructions that, upon execution by the processor, cause the system to at least:
initiate a form guidance engine;
store, by the form guidance engine, user information comprising a preference of a user, wherein the preference indicates a time period in which changes to a target state are to be completed for electronic forms;
store, by the form guidance engine, state information for an electronic form, the state information identifying a current state of the electronic form;
detect, by the form guidance engine and from the stored state information of the electronic form, a triggering event for a potential interaction of the user with the electronic form via the system, the triggering event comprising that (a) a current time is within the time period from the preference and (b) a change in state to the target state has not occurred within the time period as of the current time;
based on a detection of the triggering event:
identifying, by the form guidance engine, an action that updates content of the electronic form and thereby causes a change from the current state to the target state of the electronic form, initiating, by the form guidance engine, a presentation of a guided interaction interface that is separate from the electronic form and that is configured to guide the user to perform the action via the system, and updating, by the form guidance engine and based on a user response to the presentation, the state information of the electronic form to identify the target state.

12. The system of claim 11, wherein the state represents a set of actions to be completed to change the state to a next state, and wherein the instructions upon execution by the processor further cause the system to at least:

maintain a sub-state of the electronic form based on a state machine, wherein the sub-state indicates a progress towards completion of the set of actions of the state based on user responses, and wherein the user responses are provided as inputs to the state machine.

13. The system of claim 11, wherein the instructions, upon execution by the processor, further cause the system to at least:

rank a plurality of electronic forms based on respective potential interactions with the electronic forms; and schedule interactions with the electronic forms based on the ranking.

14. The system of claim 11, wherein the instructions upon execution by the processor further cause the system to at least:

maintain states corresponding to electronic forms, respectively, wherein each state indicates whether a respective electronic form is active or inactive;

determine that the state of the electronic form is active; and generate the presentation about the state of the electronic form based on the state being active, wherein the presentation of the guided interaction interface includes a prompt for a confirmation to interact with the electronic form via the system.

15. A non-transitory computer-readable storage medium storing instructions of a form guidance engine that, when executed on a computing system, configure the computing system to perform operations comprising:

storing user information comprising a preference of a user that indicates a time period in which changes to a target state are to be completed for electronic forms;

storing, by the form guidance engine, state information identifying a current state of an electronic form;

detecting, by the form guidance engine and from the stored state information, a triggering event for a potential interaction of the user with the electronic form via a computing device associated with the user, the triggering event comprising that (a) a current time is within the time period from the preference in the user information and (b) the current state identified in the state information is different from the target state;

based on detecting the triggering event:

identifying, by the form guidance engine, an action that updates content of the electronic form and thereby causes a change from the current state to the target state of the electronic form, and initiating, by the form guidance engine, a presentation of a guided interaction interface that is separate from the electronic form and that is configured to guide the user to perform the action via the computing device;

receiving a user response to the presentation; and updating, by the form guidance engine and based on the user response to the presentation, the state information of the electronic form to identify the target state.

16. The non-transitory computer-readable storage medium of claim 15, wherein the current state corresponds to at least one of (a) an import of the electronic form into a storage location in which the electronic form is editable by a computing device associated with user, (b) a degree of completion of the electronic form, (c) a validation of the electronic form, or (d) an export of the electronic form from the computing device to a target device.

17. The non-transitory computer-readable storage medium of claim 15, the operations further comprising:

verifying that the electronic form is available on a data source accessible to the form guidance engine;

setting, in response to said verifying, the current state of the electronic form to a value indicating that the electronic form is an available for importing to the computing device, wherein the presentation of the guided interaction interface comprises a prompt to import the electronic form;

receiving, responsive to the prompt to import the electronic form, a command to import the electronic form;

importing, by the form guidance engine, the electronic form from the data source based on receiving the command to import the electronic form; and updating the current state of the electronic form to an imported state.

18. The non-transitory computer-readable storage medium of claim 15, the operations further comprising:

detecting that the electronic form has not been exported;

setting the current state to a value indicating that the electronic form has not been exported, wherein the target state comprises an export of the electronic form;

identifying an electronic address by analyzing an electronic communication having a link to a data source at which the electronic form is available, the electronic address associated with one or more of a different user or a different computing device;

including, in the presentation of the guided interaction interface, a prompt to confirm that the electronic address as a destination for exporting the electronic form and a prompt to export the electronic form;

receiving, in the user response, a confirmation of the electronic address as the destination for exporting the electronic form and a command to export the electronic form;

implementing, based on receiving the confirmation, the command to export the electronic form by transmitting the electronic form to the electronic address.

19. The non-transitory computer-readable storage medium of claim 15, the operations further comprising:

identifying a deadline by analyzing an electronic communication having a link to a data source at which the electronic form is available;

causing the computing device to present a prompt to confirm the deadline;

receiving a confirmation of the deadline in response to the prompt;

storing, based on receiving the confirmation, the deadline in the state information; and determining, from the time period stored in the state information, that the current time is within the time period.

20. The non-transitory computer-readable storage medium of claim 15, wherein:
- the preference that indicates the time period in which changes to the target state are to be completed comprises a user preference associated with electronic form completion,
- storing the state information comprises detecting that at least a portion of the electronic form has not been filled out and setting the current state to an incomplete state,
- detecting the triggering event comprises determining that the portion of the electronic form should be filled out within the time period,
- the presentation of the guided interaction interface comprises a prompt to fill out the portion of the electronic form,
- the user response indicates that the portion of the electronic form should be filled out, wherein the operations further comprise providing a step-by-step guidance to fill out the portion of the electronic form.

\* \* \* \* \*